INVENTOR.
REINHOLD WERNER
BY Dike and Craig
ATTORNEYS

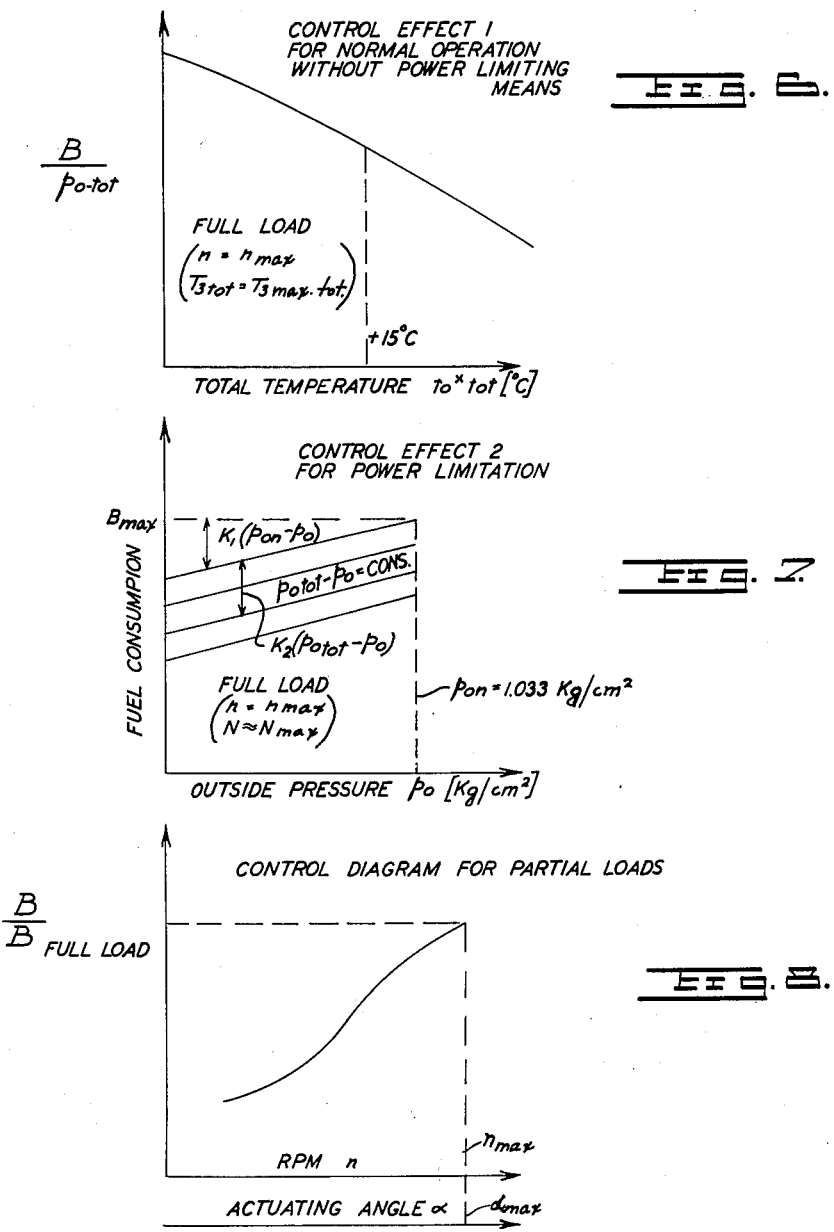

United States Patent Office 3,078,670
Patented Feb. 26, 1963

3,078,670
FUEL CONTROL SYSTEM RESPONSIVE TO AMBIENT CONDITIONS FOR COMBUSTION TURBINE POWER PLANTS
Reinhold Werner, Munich, Germany, assignor to BMW Triebwerkbau Gesellschaft m.b.H., Munich, Germany
Filed July 16, 1958, Ser. No. 749,028
5 Claims. (Cl. 60—39.28)

The present invention relates to a control system for automatically controlling the power output characteristics of a combustion-turbine power plant and to a method of operating the same, and more particularly to a control system for automatically adjusting the fuel supply to the combustion-turbine power plant of a propeller driven airplane so as to limit the power output thereof in such a way that an essentially constant power output is obtained over a predetermined range of temperatures and flight altitudes from ground to a given height or altitude as well as to the method of operation thereof.

Accordingly, it is an object of the present invention to provide a control system for a turbine-propeller power plant or power unit which obviates the inadequacies of the prior art systems, particularly as regards the development of excessive power outputs at ground and low temperatures.

It is a further object of the present invention to provide a method of operating a turbine-propeller power plant or unit as well as a control system for the realization of such operating method according to which the turbine-propeller unit power output remains essentially constant from ground up to a predetermined flight altitude or elevation, preferably also independently of any temperature variations within a given range.

It is still another object of the present invention to provide a control system for a turbine-propeller power unit which obviates the need for relatively heavy and costly speed-reduction transmissions to limit the power output of the power unit within a given range of flight altitudes.

A still further object of the present invention resides in the provision of such a control system for a turbine-propeller power plant which realizes the desired control effects with simple, inexpensive means without the need of complicated structural parts ordinarily increasing the weight of the power plant as well as the cost thereof, and which accomplishes these results automatically in a safe, reliable manner to avoid operating errors on the part of the pilot.

Another object of the present invention resides in preventing overheating of the turbine to eliminate the possibility of damage to the parts thereof exposed to the hot points or areas.

These and other objects, features and advantages of the present invention will become more obvious from the following description when taken in connection with the accompanying drawing which shows, for purposes of illustration only, one embodiment in accordance with the present invention which is capable of producing the desired control effects illustrated by reference to various graphs, and wherein:

FIGURE 6 is a diagram illustrating graphically the control effect of prior art control systems without power limiting means used with turbine-propeller power units, and in which the ratio of fuel consumption to total outside pressure $$\frac{B}{P_{0-\text{tot}}}$$

Figure 9:
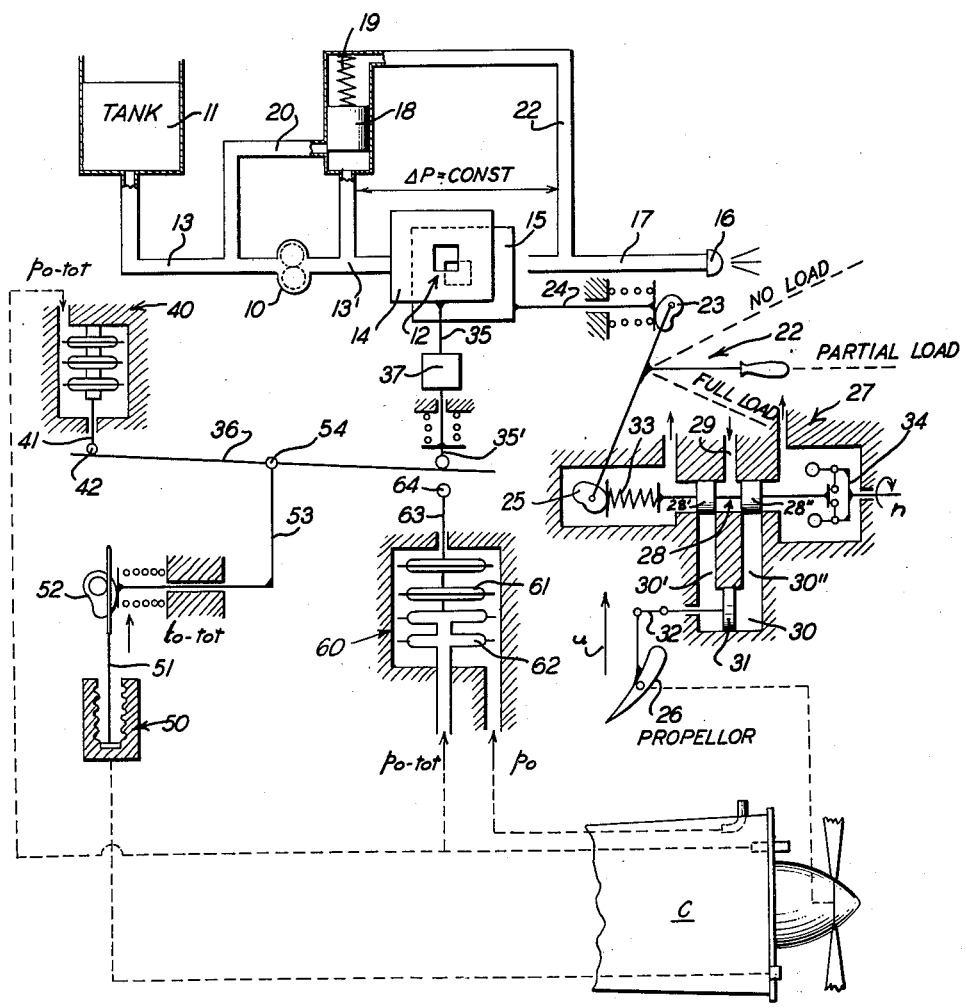

is plotted against total outside temperature $t_{0-\text{tot}}$ at full load;

FIGURE 7 is a diagram illustrating graphically the desired control effects of a control system with power limiting means in accordance with the present invention used with turbine-propeller power units, and in which the fuel consumption B is plotted against outside pressure $p_0$ at full load;

FIGURE 8 is a diagram illustrating graphically the control effect at partial loads obtained with a control system in accordance with the present invention, and wherein the ratio of actual fuel consumption to maximum fuel consumption $$\frac{B}{B_{\max}}$$

is plotted against rotational speed $n$ and against the angle $\alpha$ of the gas lever or stick; and FIGURE 9 is a schematic view of a control arrangement for a turbine-propeller power plant or unit in accordance with the present invention.

Figure 1:
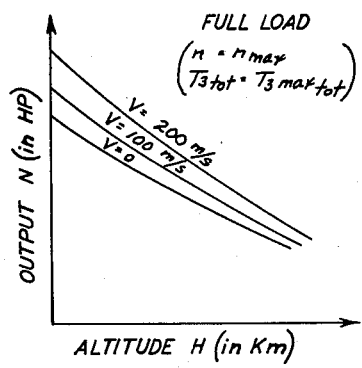
FIGURE 1 is a diagram illustrating graphically the power output characteristics of a conventional turbine-propeller plant at full load with changes in the flight altitudes for different flight speeds thereof and in which the power output N is plotted against changes in altitude H.
Figure 2:
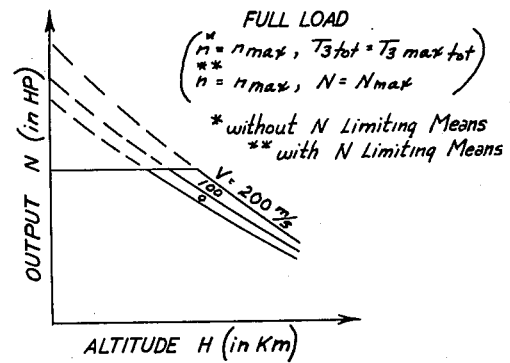
FIGURE 2 is a diagram, similar to FIGURE 1, illustrating graphically the desired power output characteristics of a turbine-propeller power plant provided with a power-limiting control system in acordance with the present invention.

The power output characteristic of a conventional turbine-propeller power plant or power unit operating at full load is of a nature as shown in FIGURE 1 in which power output N (in h.p.) is plotted along the ordinate against the altitude H (in k.m.) along the abscissa for different flight speeds, and which clearly shows that the power decreases with an increase in altitude or height of the plane in flight. Recently, however, the trend is towards obtaining power or output characteristics for such power plants as shown diagrammatically in FIGURE 2, that is, a power or output characteristic in which the power output remains constant over a relatively large range of altitudes from zero on up. This is done for the following reasons. The turbine-propeller power plant or power unit is normally designed for high-altitude flights because at those altitudes the greatest economy of operation is attained. The resulting power outputs on the ground which would then result therefrom without power limiting means as indicated in the dash lines of FIGURE 2 are then generally much larger for modern aircraft designs than actually required, for instance, for the take-off, even though the largest power output, as is well known, is required at take-off.

In order to avoid an unnecessarily heavy speed-reduction transmission for the propeller drive while at the same time producing an economic power output at high altitudes, a limitation of the output of the turbine-propeller power plant is necessary, and more particularly within the range from ground level up to a certain altitude. Moreover, the power limitation must thereby be accomplished automatically so as to avoid overloading of the transmission as a result of any possible operating mistakes or errors on the part of the pilot.

Figure 3:
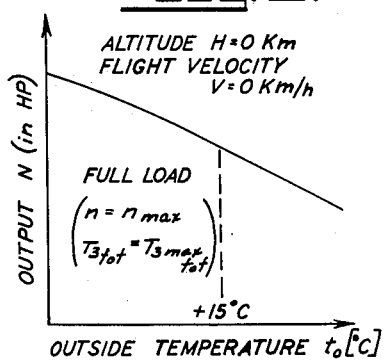
FIGURE 3 is a diagram illustrating graphically the power output characteristics of a conventional turbine-propeller power plant, at full load, at zero flight speed and at ground, with changes in the ambient or outside temperature and in which the power output N is plotted against changes in ambient temperature $t_0$.
Figure 4:
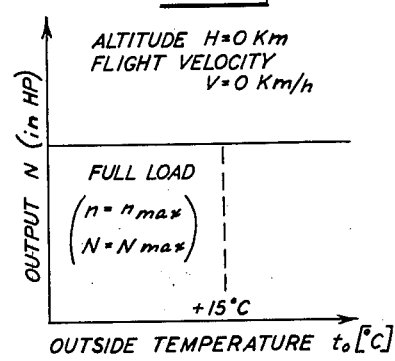
FIGURE 4 is a diagram, similar to FIGURE 3, illustrating graphically the desired power output characteristics of a turbine-propeller power plant provided with a power-limiting control system in accordance with the present invention.

If, on the other hand, the power output characteristics of a turbine-propeller power plant or power unit without power limitation is considered as a function of the ambient temperature $t_0$, then the characteristic shown in the diagram of FIGURE 3 results in which power output N is plotted against ambient temperature $t_0$. In that case, too, the very large increase in power output when operating within a range of relatively lower ambient temperatures is undesirable by reason of the increasing weight of the necessary speed-reduction gearing or transmission. On the other hand, the decrease in power output at higher ambient temperatures, as occurs, for instance, during the summer, adversely affects the take-off power of the aircraft to a considerable degree. For these reasons, a power output characteristic according to the graph of FIGURE 4 is desirable whereby, at all ambient temperatures, an approximately constant power output is maintained.

As is well known, the limitation of the power output with respect to the flight altitude and to the ambient temperature is carried out in the power plants or units presently in use in such a manner that the torque transmitted to the propellers is mechanically measured and the thus measured value of transmitted torque is used as an impulse quantity for the power limitation. The rotative speed, as is also well known, is thereby also kept constant with a given predetermined position of the gas lever by means of the propeller control system so that the torque then becomes a measure for the power output. Measuring the torque is thereby done in such a manner that the thrust which occurs between the transmission housing and a stationary transmission gear is transmitted through an oil cushion the oil pressure of which is then used as a measure for the torque. Such a mechanical measurement of the torque, however, has the disadvantage that it requires relatively extensive structural means which involves expenditures and results in additional weight.

Figure 5:
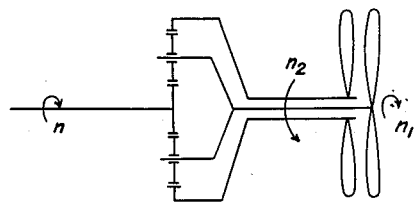
FIGURE 5 is a schematic showing of a prior art transmission used with some turbine-propeller power plants.

Moreover, there exist gear or transmission constructions for turbine-propeller power plants or power units such as the differential epicyclic gear shown, for instance, in FIGURE 5, which provide for very high power outputs a lightweight and, therefore, favorable construction. However, with these last-mentioned transmissions, a mechanical measuring of the torque in the manner described hereinabove is not possible for the reason that in this case no gear which is stationary with respect to the housing is present in the transmission arrangement. In that case, a measuring of the torque would have to be done by measuring the torsional deformation of the shaft between the transmission and the compressor which, however, is again a very difficult task that requires a large amount of additional structural components and expenditures.

The present invention has as its primary task to obtain, by simple means, the desired power output characteristics. The inventive control installation for limiting the highest permissible power output is applicable to gas turbines with mechanical power take-off as, for instance, to propeller-turbine power plants of conventional construction in which the compressor and the turbine are arranged on a comon shaft which drives the reduction gear for the propeller or propellers, and with speed regulating means associated therewith.

The installation and method of operation in accordance with the present invention is thereby characterized that within the predetermined limited range of flight-altitudes, the amount of fuel is decreased with decreasing static pressure and possibly with an increasing differential between the total pressure and the static pressure. The arrangement according to the present invention for carrying out this method of operation consists of a measuring device, for instance, a vacuum cell or cells for measuring the static pressure and of a measuring device for measuring the difference between the total pressure and the static pressure, for instance, a measuring cell to the inside of which the total pressure is admitted while the static pressure is admitted to the outside thereof. The two measuring devices may thereby be interconnected, for instance, in series to act on a common transmitter or control member for controlling the quantity of fuel neccesary in order to maintain the power output constant, whereby the other control values such as, for instance, the temperature and total pressure are kept ineffective or rendered inoperative, in the alternative, become effective or are rendered operative only as soon as they indicate or would adjust a lower maximum fuel quantity than the quantity indicated or adjusted by the control values according to the invention, namely by the static pressure and the difference between the total pressure and static atmospheric pressure.

Consequently, according to the present invention, an additional control arrangement consisting, for instance, of measuring devices such as measuring cells or bellows which measure the existing static pressure and the difference between total pressure and the static pressure with both pressures measured in the free atmosphere, is added or coordinated to the known control devices which influence the rate of fuel flow in dependence on the existing total pressure and on the total temperature ahead of the compressor and which are normally valid for flight conditions in which the power outputs lie below the highest permissible transmission loading and which are ordinarily designed according to the requirement of constant maximum temperature at constant speed.

In connection therewith, the known control devices as well as the control devices according to the present invention have to cooperate in such a manner that, at all times, the smaller value of the fuel quantity is delivered or supplied to the power plant, that is, those quantities which can still be tolerated with respect to the highest permissible temperature as well as also with respect to the highest permissible transmission load. The partial loads of the power plant are adjusted in a known manner by means of the gas lever by the simultaneous lowering of the fuel consumption and of the controled or regulated rotative speed of the power plant as illustrated in FIGURE 8 in which the ratio of $$\frac{B}{B_{\text{full load}}}$$

is plotted against the rotational speed $n$ and also against the angle $\alpha$ of the adjusting gas lever or stick. Consequently, a predetermined fixed relationship exists by means of the speed governor between the gas lever setting and the rotary speed of the power plant or power unit.

One embodiment of a control arrangement in accordance with the present invention is illustrated in FIGURE 9 in which a gas turbine engine of the turbo-prop type comprising a compressor section C is shown schematically in order to indicate the sources of the various measured variables which act on the control system according to the invention. As further shown in FIGURE 9 of the drawing, a fuel pump 10 of any suitable construction supplies fuel from tank 11 to a throttling device or place generally designated by reference numeral 12 over supply line sections 13 and 13'. The throttling device 12 which includes a vertically movable member 14 and a horizontally movable member 15 determines by the variable cross-sectional area of the flow passage thereof the amount of fuel delivered to the injection device 16 over delivery line 17. A throttling valve 18 which is spring-loaded by means of a suitable spring 19 is arranged in a by-pass line 20 by-passing the fuel pump 10 by connecting the output with the input thereof, i.e., by connecting the line sections 13 and 13' with each other. Additionally, the throttling valve 18 is also subjected or acted on by the pressure prevailing in the delivery line 17 or in the output of throttling device 12 by means of control line 22 so that a constant pressure difference $\Delta p$ exists between delivery line 17 and supply line section 13' irrespective of any changes in the cross-sectional area of the flow passage in throttling device 12.

The horizontally and vertically movable control members 14 and 15 which are illustrated herein for convenience as plate members may be of any suitable known construction, for example, may be of corresponding construction to form part of a rotary slide valve control member of suitable construction which may be used as throttling device 12. The movements of the horizontally movable control member 15 are regulated by adjusting the gas lever or stick generally designated by reference numeral 22 which may normally be set to any number of partial-load positions between the no-load or stop position thereof and the full load or open throttle position thereof, as is well known. For that purpose, the gas lever 22 is connected in any suitable manner with the horizontally movable control member 15, for example, by means of a cam member 23 abutting against a spring-loaded connecting link 24 provided with a suitable abutment surface or cam follower adapted to cooperate with cam member 23.

Additionally, the gas lever 22 is provided with a further cam member 25 for purposes of simultaneously adjusting also the propeller 26 by means of the rotational speed-responsive control device generally designated by reference numeral 27. The speed-responsive control device 27 may be of any suitable conventional construction and may include, for instance, a spool-type slide valve member 28 having two piston parts 28' and 28" valving respectively the flow of a pressure medium, such as oil under pressure, from inlet port 29 into the passages 30' and 30" leading to respective sides of piston member 31 slidingly accommodated within cylinder space 30. The piston member 26 in turn is operatively connected with the propeller 31 over connecting linkage 32 to adjust the same in any suitable manner, for example, by adjusting the pitch of the propeller blades thereof as is well known. The spool-type control valve member 28 is acted on by two oppositely directed forces, namely the force exerted on one side thereof by the cam member 25 over compression spring 33 which may be selected to provide a given preloading under certain operating conditions, and the force exerted on the other side by a speed-responsive device 34, such as a centrifugal speed governor, which is adjusted in dependence on the rotational speed $n$ of the turbine power plant or unit (not shown). The control effect obtained by means of speed-responsive control device 27 is represented graphically in FIGURE 9 by vector $u$.

The vertically movable control member 14 is automatically adjusted by means of connecting link 35 of suitable construction which itself is adjusted in the vertical direction by the position of adjusting lever 36. In the illustrated embodiment, a hydraulic servo-motor or amplifier 37 is inserted between spring-loaded link member 35' abutting against the adjusting lever 36 and the link member 35 connected with vertically movable control member 14. The servo-motor 37 may be of any suitable type of construction and permits the physical locating of link members 35 and 35' at different places.

The adjusting lever 36 is adapted to be adjusted by three control or measuring devices generally designated by reference numerals 40, 50 and 60. The measuring or control device 40 which may include one or several pressure-responsive cells or bellows of conventional construction measures, i.e., is responsive to the total outside or external pressure $p_{0-tot}$ ahead of the compressor. This total pressure is composed of the static pressure and the dynamic pressure. At zero flight speed, the total pressure $p_{0-tot}$ would therefore be equal to the static pressure $p_0$, whereas in flight the dynamic or ram pressure would be added to the static pressure. The adjusting rod 41 thereof abuts at point 42 on the left end of adjusting lever 36 as viewed in FIGURE 9.

The measuring or control device 50 is a temperature-responsive device of any suitable construction, responsive to the total outside temperature $t_{0-tot}$ ahead of the compressor. Total outside temperature $t_{0-tot}$ is composed of the ambient temperature and the temperature increase due to the ram pressure. Thus, at zero flight speed, the total outside temperature would be equal to the ambient temperature $t_0$, whereas in flight the temperature increase due to the ram effect would be added thereto. The adjusting rod 51 is so constructed as to rotate cam member 52 with variations in the outside temperature $t_0$ while rotation of cam member 52 in turn actuates spring-loaded adjusting linkage 53 to thereby adjust the point of fulcrum 54 of adjusting lever 36 in response to temperature variations.

The measuring or control device 60 which includes two sets 61 and 62 of pressure-responsive cells or bellows of any suitable construction is responsive to the combined control effects of static pressure $p_0$ and to the difference of total pressure minus static pressure $p_{0-tot}-p_0$. For that purpose, the set of cells 61 consists of vacuum cells, i.e., cells or bellows evacuated on the inside thereof while the second set of cells 62 is subjected on the inside thereof to the total pressure $p_{0-tot}$ and on the outside thereof to static pressure $p_0$. The combined control effect produced by pressure cells 61 and 62 is transmitted to adjusting lever 36 by adjusting rod 63 at point 64.

*Operation*

The operation of the installation for limiting the power output in accordance with the present invention is as follows.

The fuel pump 10 furnishes fuel to the throttling device or place 12 whereby the differential-pressure control or regulating device 18 maintains a predetermined pressure differential at the variable-area throttling place 12. As a result thereof, the fuel quantity delivered to the power plant over injection line or lines 17 is thereby dependent only on the cross-sectional flow area at the throttling device 12. The vertical movement of the plate 14 is produced, in a known manner, by a hydraulic servo-device 37 as a function of the total pressure $p_{0-tot}$ and of the total outside temperature $t_{0-tot}$ as determined by measuring devices 40 and 50, and, for purposes of limiting the power output, is additionally influenced by the values of the static pressure $p_0$ and of the difference between total pressure less static pressure $p_{0-tot}-p_0$, as determined by measuring device 60. The horizontal movement of the plate 15 is effected by the adjustment of the gas lever 22 and causes a lowering of the fuel quantity and of the speed upon adjustment thereof to partial loads. The throttling device 12 may be constructed, for example, as a rotary slide valve.

Within the normal range of operation and without any limitation of the power output, a flow area is adjusted at the throttling place 12 by means of the measuring device 40 which is proportional to the total pressure $p_{0-tot}$. The correction of the fuel quantity as a function of the total outside temperature $t_{0-tot}$ takes place by means of the measuring device 50 and the cam 52 by displacing the fulcrum 54 of the beam or lever 36. With those two control devices 40 and 50 only, the power output at ground level would be too high as indicated in FIGURE 1. This condition is avoided according to the present invention by means of a control device 60 by means of which the maximum fuel quantity is limited in dependence on the static pressure $p_0$ and the difference between total outside pressure less static pressure $p_{0-tot}-p_0$, as shown in FIGURE 7, which indicates graphically the control diagram or effects under full load condition in accordance with the present invention.

When the control device 60 becomes operative, i.e., commences to act, the point 64 forming the abutment surface of the adjusting rod 63 thereof touches the beam 36 and thereby lifts off the beam 36 from point 42 forming the abutment surface of the adjusting rod 41 of measuring device 40. The control device 60 for limiting the load consist in the embodiment illustrated in FIGURE 9 essentially of two cells or bellows positively connected with each other. One set of cells or bellows 61 consists of evacuated cells (vacuum cells) and effects a decrease in the quantity of fuel as a result of a change in flight altitude as shown in FIGURE 7 by the value designated $K_1(p_{0n}-p_0)$. The second set of cells or bellows 62 is acted upon on the inside thereof of the total pressure $p_{0-tot}$ and on the outside by the static pressure $p_0$ and effects a decrease of the fuel quantity if the flight velocity is increased as shown in FIGURE 7 by the value designated $K_2(p_{0-tot}-p_0)$. By a corresponding dimensioning of the cells or bellows by appropriate selection of the constants $K_1$ and $K_2$, the control installation according to the present invention may be so arranged that the maximum power of the power plant remains nearly constant over a large altitude and velocity range (FIGURE 2). However, in some cases with such power plants, the control effect or influence of the pressure difference between total pressure and static pressure $p_{0-tot}-p_0$ may be omitted by omitting the set of bellows 62.

The power output characteristic on the ground, as shown in FIGURE 4, is obtained automatically inasmuch as the control device 60 normally maintains the desired quantity of fuel constant regardless of changes in the ambient temperature $t_0$. A nearly constant power output is obtained thereby. The total temperature ahead of turbine $t_{3\;tot}$ increases in this case with increasing ambient temperatures. It may then happen with turbine power plants having slight power limitational controls that with an ambient temperature which lies still below the highest possible value at the ground, the maximum total temperature $t_{3\;max-tot}$ is reached ahead of the turbine. With still higher ambient temperature values, the control device 50 would again become effective and the power output would again be reduced as illustrated in the graph of FIGURE 3.

For partial loads, characteristics as shown in FIGURES 2 and 4 would result with correspondingly reduced outputs. The deviations from the operating characteristics at constant output then, however, become generally larger. This, however, is hardly of any practical significance inasmuch as all partial loads are smaller than the highest permissible output or load.

FIGURE 9 merely shows an illustrative embodiment of a combination according to the present invention, namely, of the inventive control device 60 with other known control or regulating devices such as the control devices 40 and 50 and the propeller control, whereby the known control and regulating devices may be replaced with other equivalent devices which produce the same effect or whereby one or the other device could be omitted. The subject matter of the present invention could also be combined, for instance, with control devices which do not rely on the total temperatures $t_{0-tot}$ ahead of the compressor such as the device 50 but which operate in dependence on the temperature of the gas prior to entrance thereof into the turbine or which do not measure the total atmospheric outside pressure $p_{0-tot}$ ahead of the compressor such as does the device 40 but use as a reference value the pressure of the combustion air behind of or leaving the compressor.

Thus, it is obvious that the present invention is not limited to the specific embodiment illustrated herein but is susceptible of many changes and modifications within the scope and spirit of the present invention, and I, therefore, intend to cover all such changes and modifications as encompassed by the scope of the appended claims.

I claim:
1. A control system for limiting the power output of an aircraft gas turbine power plant of the turboprop type provided with a compressor driven by a gas turbine, with propeller means driven by said turbine through reduction gearing means, and with adjustable fuel supply means for supplying variable quantities of fuel to said power plant, comprising first control means operatively connected with said fuel supply means for selectively adjusting the quantity of fuel supplied to said power plant, second control means operatively connected with said fuel supply means for limiting the maximum amount of fuel supplied to said power plant in dependence on operating variables to prevent overheating of said turbine and overloading of said reduction gearing means, and third control means operatively connected with said fuel supply means for decreasing within a predetermined altitude range the quantity of fuel supplied to said turbine in dependence upon an operating pressure variable, said third control means including pressure response means and being effective to normally override and render ineffective said second control means within said predetermined altitude range, said third control means being effective to provide a substantially constant power output irrespective of atmospheric temperature within said predetermined altitude range.

2. A control system for limiting the power output of an aircraft gas turbine power plant of the turboprop type provided with a compressor driven by a coaxially arranged gas turbine, with propeller means driven by said turbine through reduction gearing means, and with adjustable fuel supply means for supplying variable quantities of fuel to said power plant, comprising first control means operatively connected with said fuel supply means for selectively adjusting the quantity of fuel supplied to said power plant, said first control means including manual means for selectively predetermining the power output of said turbine, second control means operatively connected with said fuel supply means for limiting the maximum amount of fuel supplied to said power plant in dependence on operating temperature and pressure variable to prevent overheating of said turbine and overloading of said reduction gearing means above a predetermined altitude range, and third control means operatively connected with said fuel supply means for decreasing within said predetermined altitude range the quantity of fuel supplied to said turbine with a decrease in atmospheric pressure, the operative connection of said third control means with said fuel supply means overriding said second control means within said predetermined altitude range, said third control means including a vacuum pressure box and a pressure box subjected on the inside thereof to the total pressure ahead of the compressor and on the outside thereof to atmospheric pressure, said pressure boxes being effectively connected to produce a combined control effect upon the quantity of fuel supplied to said turbine.

3. A control system according to claim 2, further comprising means rendering said second control means ineffectual as long as the amount of fuel supply determined thereby is greater than that determined by said third control means.

4. A control system according to claim 2, further comprising connecting means interconnecting at least some of said control means with each other to adjust said fuel supply means to supply the minimum quantity of fuel as determined by any one of said interconnected control means.

5. A control system as defined in claim 4, wherein said connecting means include pivotal means having an adjustable point of fulcrum.

References Cited in the file of this patent
UNITED STATES PATENTS

| | | |
|---|---|---|
| 2,514,513 | Price | July 11, 1950 |
| 2,599,507 | Wyckoff | June 3, 1952 |
| 2,601,777 | Woodward | July 1, 1952 |
| 2,616,507 | Greenland | Nov. 4, 1952 |
| 2,642,718 | Pearl | June 23, 1953 |
| 2,670,599 | Davies et al. | Mar. 2, 1954 |
| 2,671,620 | Andrews | Mar. 9, 1954 |
| 2,706,885 | Ostroff et al. | Apr. 26, 1955 |

(Other references on following page)

UNITED STATES PATENTS

| | | |
|---|---|---|
| 2,796,136 | Mock | June 18, 1957 |
| 2,804,748 | Hutchinson | Sept. 3, 1957 |
| 2,808,702 | Dotson | Oct. 8, 1957 |
| 2,829,722 | Best | Apr. 8, 1958 |
| 2,872,133 | Seeger | Feb. 3, 1959 |

OTHER REFERENCES

Ser. No. 281,826, Stieglitz et al. (A.P.C.), published May 18, 1943.